United States Patent [19]

Ramsauer

[11] 4,224,362
[45] Sep. 23, 1980

[54] METHOD OF ENHANCING AN EMBOSSED TRANSLUCENT FLEXIBLE SHEET MATERIAL

[76] Inventor: Larry R. Ramsauer, 5862 Paddon Circle, San Jose, Calif. 95123

[21] Appl. No.: 972,076

[22] Filed: Dec. 22, 1978

[51] Int. Cl.² ............................................ B05D 5/06
[52] U.S. Cl. .................................. 427/265; 427/256; 427/258; 428/201; 428/207
[58] Field of Search ............................ 101/23, 32, 363; 428/201, 207; 264/1, 132; 427/275, 258, 265, 256

[56] References Cited

U.S. PATENT DOCUMENTS

| | | | |
|---|---|---|---|
| 1,819,793 | 8/1931 | Ross | 101/23 X |
| 2,855,844 | 10/1958 | Stewart | 427/275 X |
| 3,636,147 | 1/1972 | Rowland | 264/1 |

OTHER PUBLICATIONS

*Flexography: Principles and Practices*, New York City, Flexographic Technical Association, Inc., 1962, pp. 16, 18-22, 75, 85, 246, 250, 254.

Primary Examiner—Evan K. Lawrence
Attorney, Agent, or Firm—Richard Alan Brown

[57] ABSTRACT

A method of enhancing an embossed translucent flexible sheet material is provided wherein extremely fine lenslets on at least one surface of the sheet material are coated with inking solutions to thereby generate visual display patterns. Further, secondary processing may be added to provide optimum contrast, overall material sparkle and brilliance when viewed from the viewing side.

15 Claims, 11 Drawing Figures

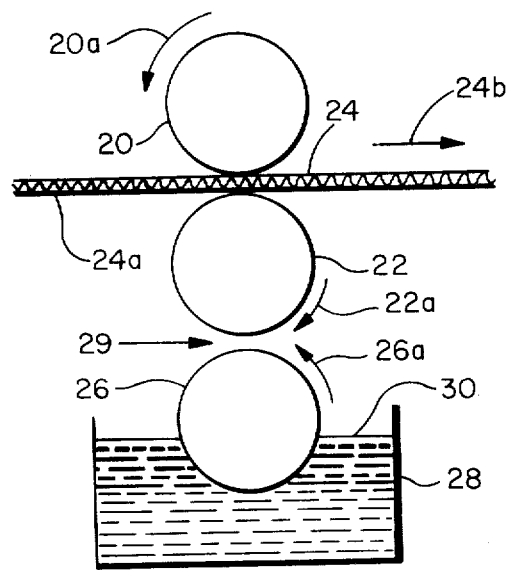
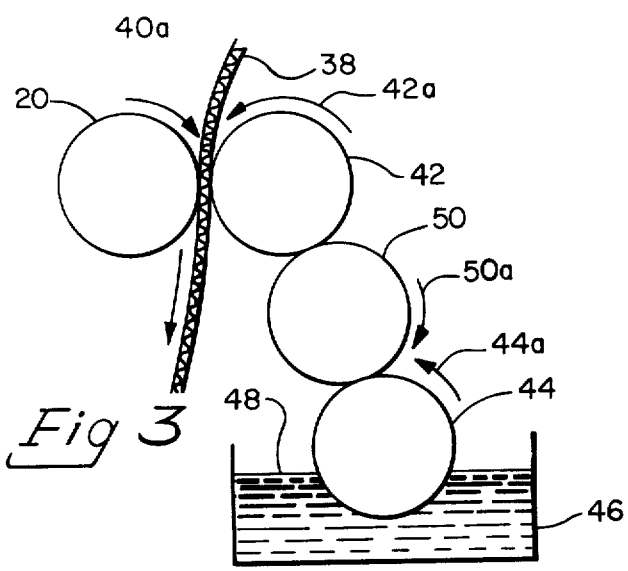
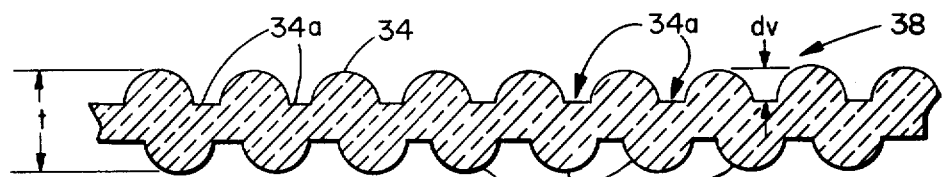
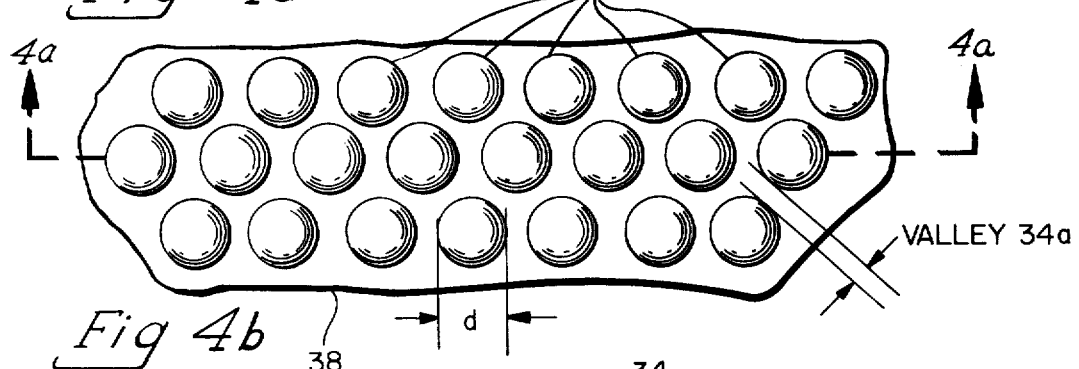
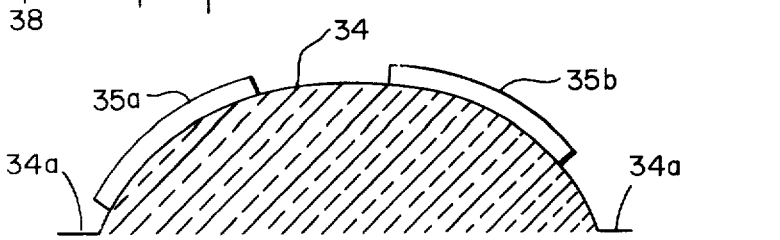

METHOD OF ENHANCING AN EMBOSSED TRANSLUCENT FLEXIBLE SHEET MATERIAL

BACKGROUND OF THE INVENTION

1. Field of the Invention

The present invention relates to an improvement in processing of embossed translucent flexible sheet material, and more particularly to the coating of embossed lenslets with inking solutions on at least one surface of the sheet material to thereby generate visual display patterns.

2. Prior Art

In the past, the coloring or inking of lenslets embossed on a synthetic plastic material capable of producing a wide variety of optical effects has been relatively simple as a result of the fact that the sheet material is rigid and the individual lenslets are relatively large in size. For example, such prior art sheet material is approximately 0.015 inches thick with lenslets having a diameter of approximately 0.010 inches embossed thereon.

The technique for coloring the large lenslets, as will be explained in greater detail hereinbelow, is relatively straightforward and employs the use of conventional printing rollers. A first roller is suspended in a bath of ink for transferring the ink to a second roller which then transfers the ink to the lenslets on the sheet material. This process is satisfactory for coloring such large lenslets of rigid material. However, if one were to use a flexible material such as a thin sheet of flexible material (e.g., thickness of about 0.0075 inches) having a multiplicity of very fine lenslets located thereon, the prior art printing process is not adequate. That is, the prior art printing technique not only covers each of the very fine lenslets (e.g., diameter of 0.004 to 0.005 inches) but also floods the very fine valleys therebetween, which obfuscates any possible visual patterns that may be produced.

SUMMARY OF THE INVENTION

A method of enhancing a translucent flexible sheet material having embossed lenslets on at least one surface thereof wherein each of said lenslets has a height from about 0.001 to about 0.002 inches, the method comprising the steps of passing a web of the embossed flexible sheet material between an impression roller and a printing roller having a hardness from about 45 to about 65 Shore A durometer, depositing ink from an ink fountain onto the printing roller by means of, rotating a fountain roller in the ink fountain, the fountain roller having a hardness from about 40 to about 80 Shore A durometer and transferring the ink from said fountain roller to the printing roller by means of an anilox roller having a quad from about 150 to about 300 cells per inch, and tipping the lenslets with ink from the printing roller while the web of sheet material passes between the impression and the printing rollers.

It is an object of the present invention to provide a novel processed and enhanced flexible sheet material having very fine lenslets thereon which is capable of producing various optical effects with light rays falling thereon over a wide angle of incidence.

Another object is to provide a novel and relatively economical processed decorative sheet material capable of providing optical pattern effects suitable for use as a display material, decorative trim or other applications.

Still another object of the present invention is the provision of a printing process adapted for precisely inking selected portions of very fine lenslets while not inking the valleys between the lenses.

A feature of the present invention resides in the provision of a unique inking process particularly adapted for precisely inking selected portions of very fine lenslets of a flexible sheet material.

Another feature of the present invention resides in the provision of an inking process which further processes the sheet material having inked lenslet tips with a high opacity brilliant white ink to provide optimum contrast, overall material sparkle, and brilliance when viewed from the viewing side of the sheet material.

A still further feature of the present invention resides in the provision of a silver-white ink mixture coating over the entire surface of the flexible sheet material having inked lenslet tips and the high opacity brilliant white ink so as to provide increased light opacity to the overall finished product.

BRIEF DESCRIPTION OF THE DRAWINGS

FIG. 1 is a diagramatic-schematic drawing of a typical prior art printing process;

FIG. 2 is a size-comparison diagram showing cross-sectional view of a prior art lenslet as contrasted with a lenslet of the thin, flexible sheet material processed by the present invention;

FIG. 3 is a diagramatic-schematic drawing of the printing process of the present invention;

FIG. 4a is a cross-sectional view of an exemplary flexible sheet material to be processed by the present invention;

FIG. 4b is a planar view of the exemplary flexible sheet material shown in FIG. 4a;

FIG. 4c illustrates the optimum lens tipping of an individual lenslet; and,

DETAILED DESCRIPTION

Figure 5A:
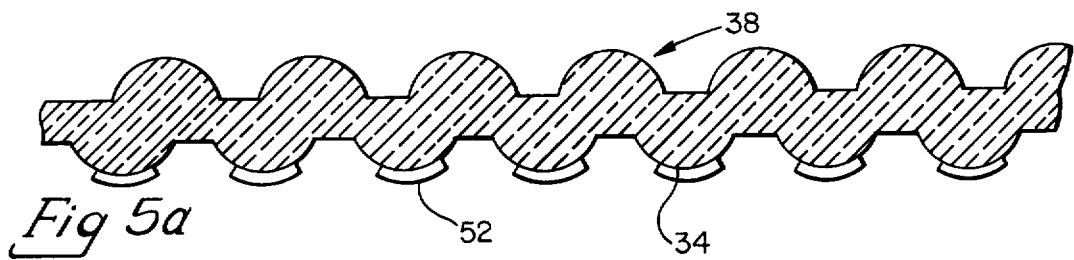
FIGS. 5a through 5e illustrate cross-sectional views of the flexible sheet material to be enhanced by the process of the present invention with various processing steps performed thereon.

Referring now to the drawings, and in particular to FIG. 1, an illustration of the printing apparatus of the prior art is illustrated, which apparatus is adapted for printing the tips of large lenslets. A backup roller 20 is urged against a printing roller 22 with a web of substantially rigid optical material 24 disposed therebetween for printing thereon. The printing roller 22 is geared to and opposes an ink pickup roller 26 which is disposed in an ink fountain 28 containing an inking or printing solution 30.

In operation, the pickup roller 26 rotates in the direction of the arrow 26a, picks up ink 30 from the vat or ink fountain 28 and disperses this ink in space 29 between these rollers for deposition onto the surface of the printing roller 22. The ink deposited on the roller 22 is transferred to surface 24a of the web of embossed optical material 24 being transported in the direction of the arrow 24b. The embossed web material 24 is brought into contact with the surface of the printing roller 22 by friction being urged by the backup roller 20 moving in the direction of the arrow 20a.

To more fully appreciate the process being described herein and illustrated in FIG. 1, reference is made to the cross-sectional diagram of FIG. 2. The prior art lens tipping or coloring operation was adapted for printing on the tip of a large lenslet 32 (approximately 0.010 inches in diameter) as contrasted with a fine lenslet 34 having a diameter of 0.004 to 0.005 inches. The term "tipping" as used herein shall refer to the coloring or inking of a selected portion of a lens. The prior art embossed web of optical material 24 (FIG. 1) typically has 100 lenslets per linear inch. The embossed flexible sheet material processed by the present invention typically has 200 lenslets per linear inch. Thus, it may be appreciated that tipping of the lens 32 of the prior art web of optical material is simpler than tipping of the very fine lenslets 34 of a flexible sheet of embossed material.

A printing apparatus that may be adapted for precisely tipping the lenslets of a sheet of the flexible material in accordance with the present invention is shown in FIG. 3. The illustrated apparatus is the printing head assembly of a flexographic web printing press. I have discovered that a "stack" or "central drum impression" type of flexographic press may be employed for the teachings of my invention disclosed herein. The workpiece is a sheet 38 of flexible material having a multiplicity of lenslets 34 embossed on at least one surface thereof, with valleys 34a formed between the lenslets 34 (FIGS. 4a and 4b). The sheet 38 is passed between an impression roller 40 and a printing roller 42 rotated in the direction of the arrows 40a and 42a, respectively. A fountain roller 44 is disposed in an ink fountain 46 containing a printing ink 48, and the roller 44 is rotated in the direction of arrow 44a. An anilox roller 50 is disposed between the printing roller 42 and the fountain roller 44 for transferring ink from the fountain roller to the printing roller. When the rollers 42 and 44 rotate as indicated by arrows 42a and 44a, respectively, the roller 50 rotates in the direction of the arrow 50a. Rollers 40, 42, 44 and 50 all rotate at substantially the same tangential or surface speed.

In order to tip (i.e. color selected portions) the lenslets of the embossed flexible sheet material a conventional steel impression roller 40 is employed. However, the printing roller 42 is preferably constructed of a rubber material having a hardness from about 50 to about 60 Shore A durometer so as to precisely color selected portions of the lenslets. The roller 42 is ground and polished round to journals within a maximum of 0.0015 inches total indicator reading (TIR) so as to maintain an even pressure against the material 38 and evenly coat the lenslets. Preferably, however, the roller 42 is ground and polished to journals within 0.0005 inches TIR. The anilox roller 50 is preferably 250 quad (i.e. 250 cells per inch) for optimum transfer of an even layer of ink from the fountain roller 44 to the printing roller 42. The fountain roller 44 is preferably constructed of a rubber material having a hardness of about 70 Shore A durometer for optimum ink transfer rate to the printing roller when using an amilox roller 50 of approximately 250 quad as explained hereinabove. It is noted that the combination of the above-stated parameters for the hardness of the fountain roller 44 and the quad of the anilox roller 50, as well as the viscosity of the ink 30, and the pressure between rollers interdependently determines the amount of ink transferred to the printing roller.

In operation, the fountain roller 44 is preferably to be rotated tight against (i.e., pinched tightly against) the anilox roller 50 to minimize ink transfer to the printing roller 42. The printing roller 42 is to be set at minimum pressure against the flexible sheet material 38 to deposit an even coverage of ink on the lenslets of the material 38 without skipping (i.e. without producing voids), whereas the application of additional pressure, will cause the ink to flow into the valleys 34a between the individual lenslets 34.

I have discovered that for optimum tipping of the lenslets, the viscosity of the ink 48 is to be within the range of 7 to 12 seconds Zahn number 3 cup range. If the viscosity is less than 7 seconds Zahn number 3 cup range, too light a coloration will be produced, and if the viscosity is greater than 12 seconds Zahn number 3 cup range, a grainy appearance will be produced (grainy appearance is caused by flooding of the valleys between the lenslets). I have also discovered that as a general rule, it is preferable to start at 11 seconds Zahn number 3 cup range and gradually thin the ink (i.e. reduce the viscosity thereof) until the grainy appearance is eliminated. As a result, maximum color intensity without a grainy appearance is produced.

It is noted that the parameters stated hereinabove for the lens tipping operation are all interrelated. In particular, the ink viscosity is one of the parameters that controls the amount of ink transferred to the sheet material 38. Also, the higher the viscosity the more ink that is delivered to the sheet material and the lower the viscosity the less ink that is delivered. Also, the softer the fountain roller 44 the more ink will be left in the quad cells of the anilox roller 50. Further, the anilox roller 50 can be manufactured with a wide range of cell size and cells per linear inch, wherein each combination of cell sizes and number of cells carrying quantities of ink can vary the amount of ink transferred to the sheet material 38. Still another inter-relationship is that the printing roller 42 must be in a certain Shore A durometer range to provide optimum lens tipping. This range has been determined by experimentation to be from about 45 to 65 Shore A durometer, with the 50 to 60 Shore A durometer range being optimum. At a Shore A durometer of 70, the printing roller is too hard to allow for normal variation of the height of the very fine lenses and thickness of the flexible sheet material 38. If the hardness is less than 45 Shore A durometer, the printing roller cannot be maintained in a sufficiently round condition and tends to randomly flood the valleys between the lenslets 34. If the hardness of the printing roller 42 is fixed within a range of 50 to 60 Shore A durometer, the combination of fountain and anilox rollers and ink viscosity as specified above give the precise control of the ink film thickness as required for the above-described lens tipping operation.

For a clarification of the geometry and dimensions of the sheet 38 of flexible material, reference is made to FIGS. 4a and 4b. FIG. 4a is a cross-sectional view of the sheet 38 showing a multiplicity of symmetrical lenslets 34 formed on either surface of the sheet 38. The thickness t of the sheet 38 is about 0.0075 inches. The depth dv of the valleys of the individual lenslets is in the range from about 0.001 to about 0.002 inches and is preferably within the range from about 0.001 inches to about 0.0015 inches. FIG. 4b on the other hand, is a planar view of the sheet 38 illustrating a multiplicity of lenslets 34 formed in at least one surface thereof. Also, the diameter d of individual lenslets 34 is typically within the range of about 0.004 inches to about 0.005 inches.

The cross section of FIG. 4c illustrates the optimum lens tipping of an enlarged lenslet 34. It is believed that the ideal inking for optimum tipping is as shown by ink portion 35a, wherein ink is coated substantially close to but not in contact with the valley 34a. However, in practice ink is coated only over a substantial selected portion of the lenslet 34 as shown by ink portion 35b to assure that no flooding of the lens valleys 34a will occur.

The steps of the process of the present invention may be more fully understood by referring to FIGS. 5a through 5e, wherein a cross-sectional view of the flexible sheet 38 is illustrated with various processing steps performed thereon. In particular, FIG. 5a illustrates a cross-sectional view of the sheet 38 wherein the lenslets have been inadequately tipped by the deposition of ink 52, thereby causing a light color density as seen from the viewing side (side opposite the printing side). The problem as is graphically depicted in FIG. 5a may result from factors such as the pressure between the impression roller 40 and the printing roller 42 being inadequate. Alternatively, inadequate coverage of the lens with ink 52 may be caused by inadequate ink being transferred up by the printing roller 42.

Figure 5B:
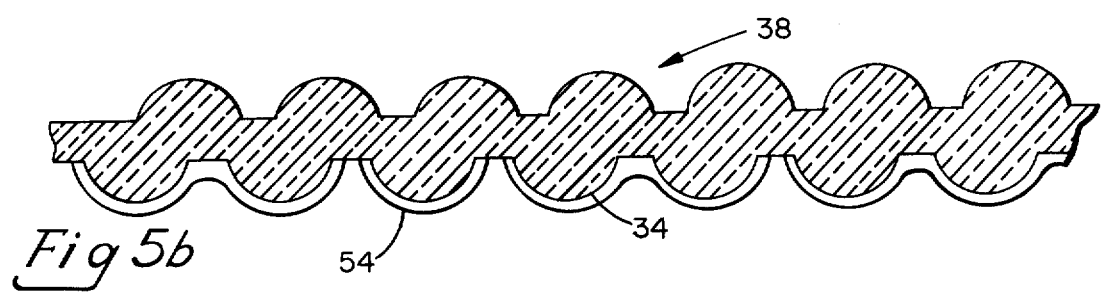

In contrast to the inadequate tipping illustrated in FIG. 5a, random or sporadic excessive lens tipping is illustrated in the diagram of FIG. 5b, which produces a dull grainy appearance. That is, if the pressure exerted between the impression roller 40 and the printing roller 42 is excessive the excessive tipping will occur. Also, if the hardness of printing roller 42 is too soft (e.g. about 40 Shore A durometer), or if the printing roller 42 is out of round with respect to the roller's journal bearings, excessive tipping will occur periodically. Also, if the ink transfer rate to the printing roller 42 is excessive, excessive lens tipping will result.

Figure 5C:
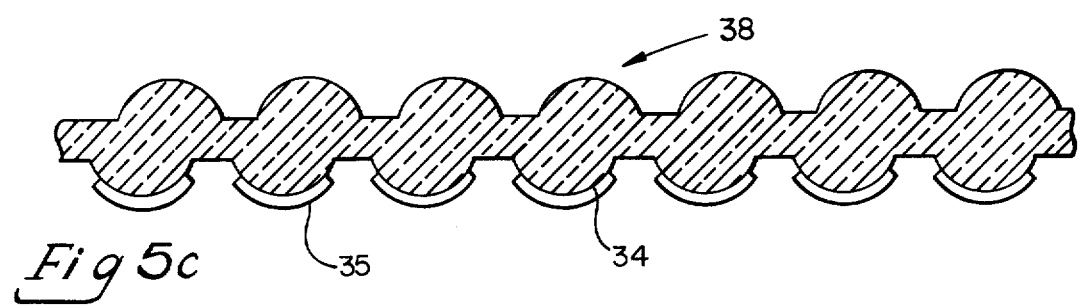

Referring now to FIG. 5c, the cross-sectional diagram of the sheet 38 illustrates an optimum tipping of the lenslets with ink 35. In particular, if all of the parameters discussed hereinabove are set within the optimum range as specified or as defined to be preferable, ink 35 will be evenly deposited over an optimum area of each of the lenslets 34 of the sheet 38. Thus, ink 35 deposited in a manner as illustrated in FIG. 5c will provide a good color density in the final enhanced product.

Figure 5D:
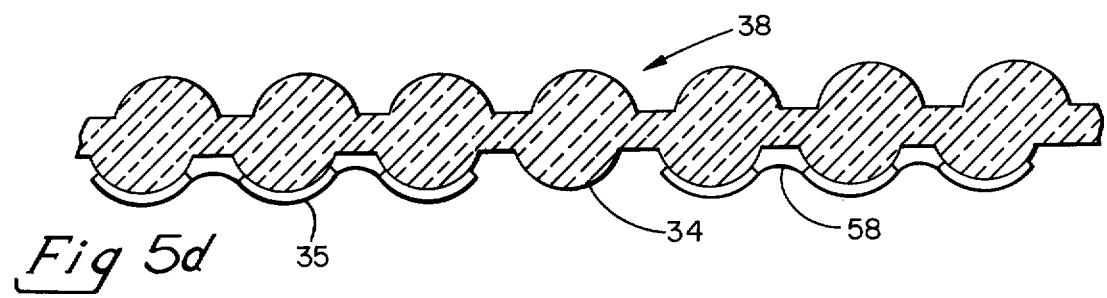
Figure 5E:
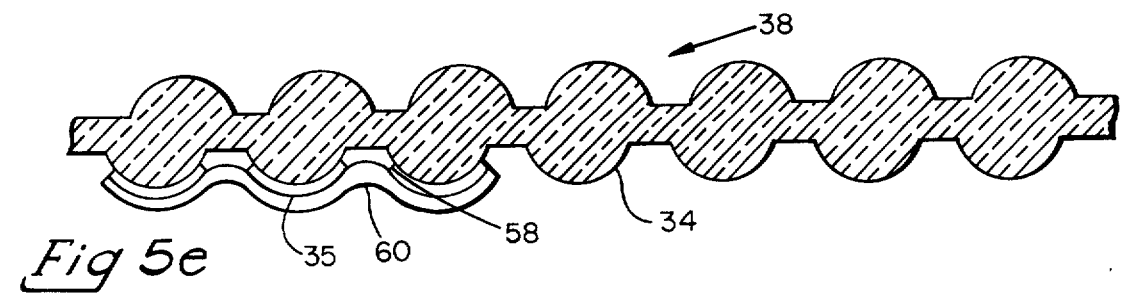

To further enhance the flexible sheet 38 as prepared by the lens tipping process described hereinabove and illustrated in FIG. 5c, the lens valleys may be flooded with a high-opacity brilliant white ink to provide optimum contrast, overall material sparkle and brilliance when viewed from the viewing side. FIG. 5d illustrates the high-opacity brilliant white ink 58 deposited in the valleys between adjacent lenslets and more particularly between the lens tipping ink 35.

To effect an optimum lens valley flooding a soft printing roller 42 is used in order to force the 58 ink into the lenslet valleys 34a, which printing roller has a hardness from about 25 to about 60 Shore A durometer (with a preferred range from about 30 to about 50 Shore A durometer). Also, the soft roller is preferred since the roller and not the lenslets will deform so that a majority of the ink is forced into the lenslet valleys and minimal ink is deposited on the lenslets themselves. The printing apparatus is identical to that illustrated in FIG. 3, and the principle of operation is to transfer a large quantity of ink from the ink fountain 46 to the printing roller 42 as well as to apply a high nip pressure between the printing roller 42 and the impression roller 40 to force the ink into the lens valleys 34a. I have found that a fountain roller 44 having a hardness of about 70 Shore A durometer in combination with an anilox roller 50 having 180 quad produces an optimum lens valley flooding. The impression roller 40 is a conventional steel roller.

In operation, the fountain roller 44 is to be run very loose (e.g. anilox roller 50 is not in direct contact with the fountain roller so that additional ink is metered to the printing roller) against the anilox roller 50 to maximize the anilox ink pickup function of this roller. As stated hereinabove, the printing roller 42 is to be run with high nip pressure against the impression roller 40 to force the ink into the valley. The ink viscosity is preferably from about 9 to about 16 seconds Zahn number 3 cup range.

It is noted that by the use of a coarse anilox roller (or a large quad, e.g., 100 cells per inch), that sufficient ink could be carried in the anilox cells to adequately flood the lenslet valleys while maintaining positive nip pressure between the fountain roller 44 and the anilox roller 50.

The flexible sheet 38 which has been color enhanced by lens tipping with ink 35 and flooding of the valleys between the lens tips by ink 58 may be further enhanced by the application of a silver-white ink mixture over the entire surface to provide a coating of increased opacity. In particular, the added feature of the coating of the silver-white ink mixture is further illustrated in FIG. 5e by the reference numeral 60. The objective with this enhancement of the product is to lay down a uniform coating of ink over the lens tips and flooded valleys with an ink having an opacity increased by adding a slight amount of silver ink to pure white ink. However, it is noted that while the addition of an excessive amount of silver ink to the white ink will increase the opacity, it will also affect the material brilliance by dulling the overall appearance.

To carry out the process of this feature the fountain roller 44 is preferably selected to have a hardness from about 40 to about 90 Shore A durometer while the anilox roller 50 is selected to have an optimum cavity or cell density of 200 quad. Also the printing roller 42 is preferably selected to have a hardness from about 60 to about 90 Shore A durometer, which printing roller is ground very round to journals (i.e. 0.001 inches TIR). As in the above described feature of the enhancement process the impression roller is of conventional steel construction.

In operation, the fountain roller 44 is preferably run very loose against the anilox roller 50 to maximize ink pickup as described hereinabove for the previously described enhancing feature. The printing roller 42 is operated at a minimum pressure against the sheet 38 so as to preferably deposit an even coat of ink 60 over the previously deposited inks 56 and 58 without skipping. I have also discovered that the viscosity of the ink for performing this enhancement operation should be within the range from about 10 to about 16 seconds Zahn number 3 cup range.

However, if the printing roller is too soft (say, less than 45 Shore A durometer), it cannot be maintained in a sufficiently round condition to uniformly cover the lens tips and valleys therebetween. Moreover, if too much pressure is used (such as would be needed for an out of round roller to cover the web) the ink would not be deposited on the lens tips and the lens tips would therefore not be opaque.

Although a specific embodiment of my invention has been described with particularity, by way of illustration and example for purposes of clarity of understanding, it will be obvious that certain changes and modifications may be practiced within the scope of the appended claims without departing from the scope of my invention.

I claim:

1. A method of enhancing a translucent flexible sheet material having embossed lenslets on at least one surface thereof wherein each of said lenslets has a height from about 0.001 to about 0.002 inches, said method comprising the steps of:
   (a) passing a web of the embossed flexible sheet material between an impression roller and a printing roller having a hardness from about 45 to about 65 Shore A durometer;
   (b) depositing ink from an ink fountain onto said printing roller by means of:
      (i) rotating a fountain roller in said ink fountain, said fountain roller having a hardness from about 40 to about 80 Shore A durometer, and,
      (ii) transferring said ink from said fountain roller to said printing roller by means of an anilox roller having a quad from about 150 to about 300 cells per inch; and,
   (c) tipping said lenslets with ink from said printing roller while said web of sheet material passes between said impression and said printing rollers.

2. A method as in claim 1 further characterized by said embossed flexible sheet material having about 200 lenslets per linear inch, and each lenslet having a diameter of between about 0.004 inches and 0.005 inches.

3. A method as in claim 1 further characterized by said ink having a viscosity from about 7 to about 12 seconds Zahn number 3 cup range.

4. A method as in claim 1 further characterized by said printing roller having a hardness from about 50 to about 60 Shore A durometer.

5. A method of enhancing a translucent flexible sheet material having embossed lenslets on at least one surface thereof wherein each of said lenslets is tipped with an ink and has a height from about 0.001 to about 0.002 inches, said method comprising the steps of:
   (a) passing a web of the embossed ink-tipped flexible sheet material between an impression roller and a printing roller having a hardness from about 25 to about 60 Shore A durometer;
   (b) depositing a high-opacity ink visually contrasting with the ink used to tip the lenslets from an ink fountain onto said printing roller by means of:
      (i) rotating a fountain roller in said ink fountain;
      (ii) transferring said ink from said fountain roller to said printing roller by means of an anilox roller; and,
   (c) printing the majority of said ink in the valleys between adjacent tipped lenslets so as to provide optimum visual contrast.

6. A method as in claim 5 further characterized by said printing roller having a hardness from about 30 to about 50 Shore A durometer.

7. A method as in either one of claims 5 or 6 further characterized by said high-opacity ink having a viscosity from about 9 to about 16 seconds Zahn number 3 cup range.

8. A method as in claim 5 further characterized by coating a uniform layer of ink over the inked surface of the flexible sheet material prepared by the method of claim 7 so as to provide an increased opacity to the finished product.

9. A method as in claim 8 further characterized by a printing roller having a hardness from about 60 to about 90 Shore A durometer.

10. A method as in either one of claims 8 or 9 further characterized by said layer of ink having a viscosity from about 10 to about 16 seconds Zahn number 3 cup range.

11. A method of enhancing a translucent flexible sheet material having about 200 lenslets per linear inch embossed on at least one surface thereof wherein each of said lenslets has a height from about 0.001 to about 0.002 inches (and a diameter of between about 0.004 and 0.005 inches, said method comprising the steps of:
   (a) passing a web of the embossed flexible sheet material between an impression roller and a printing roller having a hardness from about 50 to about 60 Shore A durometer;
   (b) depositing ink having a viscosity from about 7 to about 12 seconds Zahn number 3 cup range from an ink fountain onto said printing roller by means of:
      (i) rotating a fountain roller in said ink fountain, said fountain roller having a hardness from about 40 to about 80 Shore A durometer, and,
      (ii) transferring said ink from said fountain roller to said printing roller by means of an anilox roller having a quad from about 150 to about 300 cells per inch; and,
   (c) coloring a substantial portion of each of said lenslets with ink from said printing roller while said web of sheet material passes between said impression and said printing rollers.

12. A method of enhancing a translucent flexible sheet material having about 200 lenslets per linear inch embossed on at least one surface thereof wherein each of said lenslets is colored with ink on a substantial portion thereof and has a height from about 0.001 to about 0.002 inches and has a diameter of between about 0.004 and 0.005 inches, said method comprising the steps of:
   (a) passing a web of the embossed ink-colored flexible sheet material between an impression roller and a printing roller having a hardness from about 30 to about 50 Shore A durometer;
   (b) depositing a high-opacity ink visually contrasting with the ink used to color the lenslets having a viscosity from about 9 to about 16 seconds Zahn number 3 cup range from an ink fountain onto said printing roller by means of:
      (i) rotating a fountain roller in said ink fountain;
      (ii) transferring said ink from said fountain roller to said printing roller by means of an anilox roller; and,
   (c) printing the majority of said ink in the valleys between adjacent ink-colored lenslets so as to provide optimum visual contrast.

13. A method as in claim 12 further characterized by coating a uniform layer of ink over the inked surface of the flexible sheet material prepared by the method of claim 12 so as to provide an increased opacity to the finished product.

14. A method as in claim 13 further characterized by a printing roller having a hardness from about 60 to about 90 Shore A durometer.

15. A method as in either one of claims 13 or 14 further characterized by said layer of ink having a viscosity from about 10 to about 16 seconds Zahn number 3 cup range.

* * * * *